US012561902B2

(12) United States Patent
Ueno

(10) Patent No.: US 12,561,902 B2
(45) Date of Patent: Feb. 24, 2026

(54) INFORMATION PROCESSING APPARATUS AND INFORMATION PROCESSING METHOD

(71) Applicant: SONY SEMICONDUCTOR SOLUTIONS CORPORATION, Kanagawa (JP)

(72) Inventor: Takaki Ueno, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 313 days.

(21) Appl. No.: 18/256,256

(22) PCT Filed: Nov. 17, 2021

(86) PCT No.: PCT/JP2021/042172
§ 371 (c)(1),
(2) Date: Jun. 7, 2023

(87) PCT Pub. No.: WO2022/137901
PCT Pub. Date: Jun. 30, 2022

(65) Prior Publication Data
US 2024/0020918 A1     Jan. 18, 2024

(30) Foreign Application Priority Data
Dec. 22, 2020    (JP) ................................. 2020-212679

(51) Int. Cl.
*G06T 17/00*         (2006.01)
*G06T 7/73*          (2017.01)
(Continued)

(52) U.S. Cl.
CPC ................ *G06T 17/00* (2013.01); *G06T 7/73* (2017.01); *G06V 10/44* (2022.01); *G06V 10/761* (2022.01);
(Continued)

(58) Field of Classification Search
None
See application file for complete search history.

(56) References Cited

U.S. PATENT DOCUMENTS

2016/0148433 A1*    5/2016   Petrovskaya .......... G02B 27/01
                                                        345/633
2019/0278983 A1     9/2019   Iqbal et al.

FOREIGN PATENT DOCUMENTS

JP        2013-210968 A       10/2013
JP        2018-009927 A       1/2018
JP        2020-021372 A       2/2020

OTHER PUBLICATIONS

N. Otberdout et al. "Hand pose estimation based on deep learning depth map for hand gesture recognition," 2017 Intelligent Systems and Computer Vision (ISCV), Fez, Morocco, 2017, pp. 1-8, doi: 10.1109/ISACV.2017.8054904. (Year: 2017).*
(Continued)

*Primary Examiner* — Peter Hoang
(74) *Attorney, Agent, or Firm* — CHIP LAW GROUP

(57)                    ABSTRACT

Provided is an information processing apparatus capable of automatically executing processing according to a recognition result from a regression task. An acquirer acquires a first depth image that is a depth image of an area including a subject. Next, a pose estimator estimates coordinates of a plurality of feature points predetermined for the subject on the basis of the acquired first depth image. Then, a rendering unit generates a 3D CG model of the subject on the basis of the coordinates of the estimated feature points, and renders a second depth image obtained by imaging the generated 3D CG model with a virtual camera. Thereafter, a similarity calculator calculates similarity between the acquired first depth image and the rendered second depth image. Thereafter, the processing executor executes processing according to the calculated similarity.

16 Claims, 12 Drawing Sheets

(51) Int. Cl.
  *G06V 10/44*  (2022.01)
  *G06V 10/74*  (2022.01)
  *G06V 10/762*  (2022.01)
  *G06V 10/764*  (2022.01)

(52) U.S. Cl.
  CPC .......... *G06V 10/762* (2022.01); *G06V 10/764*
    (2022.01); *G06T 2207/10028* (2013.01)

(56)    References Cited

OTHER PUBLICATIONS

International Search Report and Written Opinion of PCT Application No. PCT/JP2021/042172, issued on Feb. 8, 2022, 08 pages of ISRWO.

Muroi, et al., "IS3-17 Prototype of gesture recognition system using CNN features and orthogonal mutual subspace method", The 25th Symposium on Sensing via Image Information, Jun. 12, 2019, pp. 1-7.

* cited by examiner

13

STORAGE DEVICE

| FIRST DEPTH IMAGE | $32_j$ |

| INFERENCE RESULT (IMAGE) | $36_j$ |

| INFERENCE RESULT (NUMERICAL VALUE) | $37_j$ |

| NORMALIZED INFERENCE RESULT (NUMERICAL VALUE) | $38_j$ |

| DETERMINATION RESULT | $39_j$ |

| IMAGING CONDITION | $40_j$ |

FIRST NORMALIZATION PROCESSING

SECOND NORMALIZATION PROCESSING

THIRD NORMALIZATION PROCESSING

ESTIMATE COORDINATE GROUP

FOURTH NORMALIZATION PROCESSING
(CONVERT COORDINATE INTO GLOBAL COORDINATE SYSTEM)

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/042172 filed on Nov. 17, 2021, which claims priority benefit of Japanese Patent Application No. JP 2020-212679 filed in the Japan Patent Office on Dec. 22, 2020. Each of the above-referenced applications is hereby incorporated herein by reference in its entirety.

TECHNICAL FIELD

The present disclosure relates to an information processing apparatus and an information processing method.

BACKGROUND ART

Conventionally, for example, there has been proposed an information processing apparatus that acquires images from a plurality of cameras, executes a classification task of performing object recognition (for example, "object present: vehicle" and "object absent") on each common area of the acquired images, and specifies an erroneously recognized image by majority decision of recognition results from the classification task and automatically collects the image (see, for example, Patent Document 1). The information processing apparatus disclosed in Patent Document 1 makes it possible to intensively learn an erroneously recognized image and to efficiently improve performance.

CITATION LIST

Patent Document

Patent Document 1: Japanese Patent Application Laid-Open No. 2020-21372

SUMMARY OF THE INVENTION

Problems to Be Solved by the Invention

However, in a case where the task performed by the information processing apparatus is a regression task, the majority decision cannot be applied directly to the recognition result from the regression task, and thus, there has been no effective method of specifying an erroneously recognized image. Therefore, it has been difficult to automatically execute processing according to a recognition result from the regression task, the processing including, for example, specifying and automatically collecting an erroneously recognized image, or the like.

An object of the present disclosure is to provide an information processing apparatus and an information processing method capable of automatically executing processing according to a recognition result from a regression task.

Solutions to Problems

An information processing apparatus of the present disclosure includes (a) an acquirer that acquires a first depth image that is a depth image of an area including a subject, (b) a pose estimator that estimates coordinates of a plurality of feature points of the subject on the basis of the first depth image acquired by the acquirer, (c) a rendering unit that generates a three dimensional computer graphics (3D CG) model of the subject on the basis of the coordinates of the feature points estimated by the pose estimator, and renders a second depth image that is a depth image obtained by imaging the 3D CG model having been generated with a virtual camera, (d) a similarity calculator that calculates similarity between the first depth image acquired by the acquirer and the second depth image rendered by the rendering unit, and (e) a processing executor that executes processing according to the similarity calculated by the similarity calculator.

Another information processing apparatus of the present disclosure includes (a) an acquirer that acquires each of first depth images that are depth images of an area including a subject, the first depth images being captured from a plurality of predetermined positions, (b) a pose estimator that estimates coordinate groups that are sets of coordinates of feature points by using a learned recognizer for each of the first depth images acquired by the acquirer on the basis of the first depth images, (c) a classifier that extracts, from the coordinate groups estimated by the pose estimator, the coordinate groups in which erroneous recognition caused by the recognizer is determined not to have occurred, and classifies extracted coordinate groups that are the coordinate groups having been extracted into groups for each similar coordinate group, and (d) a second processing executor that executes processing according to a classification result from the classifier.

Furthermore, an information processing method of the present disclosure includes (a) acquiring a first depth image that is a depth image of an area including a subject, (b) estimating coordinates of a plurality of feature points of the subject on the basis of the first depth image having been acquired, (c) generating a three dimensional computer graphics (3D CG) model of the subject on the basis of the coordinates of the feature points having been estimated, rendering a second depth image that is a depth image obtained by imaging the 3D CG model having been generated with a virtual camera, (d) calculating similarity between the first depth image having been acquired and the second depth image having been rendered, and (e) executing processing according to the similarity having been calculated.

MODE FOR CARRYING OUT THE INVENTION

Hereinafter, embodiments of an information processing apparatus and an information processing method of the present disclosure will be described with reference to the drawings.

However, the embodiments described below are merely examples, and various modifications and applications of techniques not explicitly described below are not intended to be excluded. The present disclosure can be variously modified and implemented without departing from a gist of the present disclosure. For example, the embodiments may be implemented in combination.

In addition, in the following drawings, the same or similar portions are denoted by the same or similar reference signs. Furthermore, the drawings are schematic, and do not necessarily coincide with actual dimensions, ratios, and the like. The drawings may include portions having different dimensional relationships and ratios.

Furthermore, effects described in the present specification are merely examples and are not limited, and there may be other effects.

The embodiments of the present disclosure will be described in the following order.

1 Overall configuration of information processing apparatus
2. Contents of depth image collection processing
3. Modifications

1 Overall Configuration of Information Processing Apparatus

Figure 1:
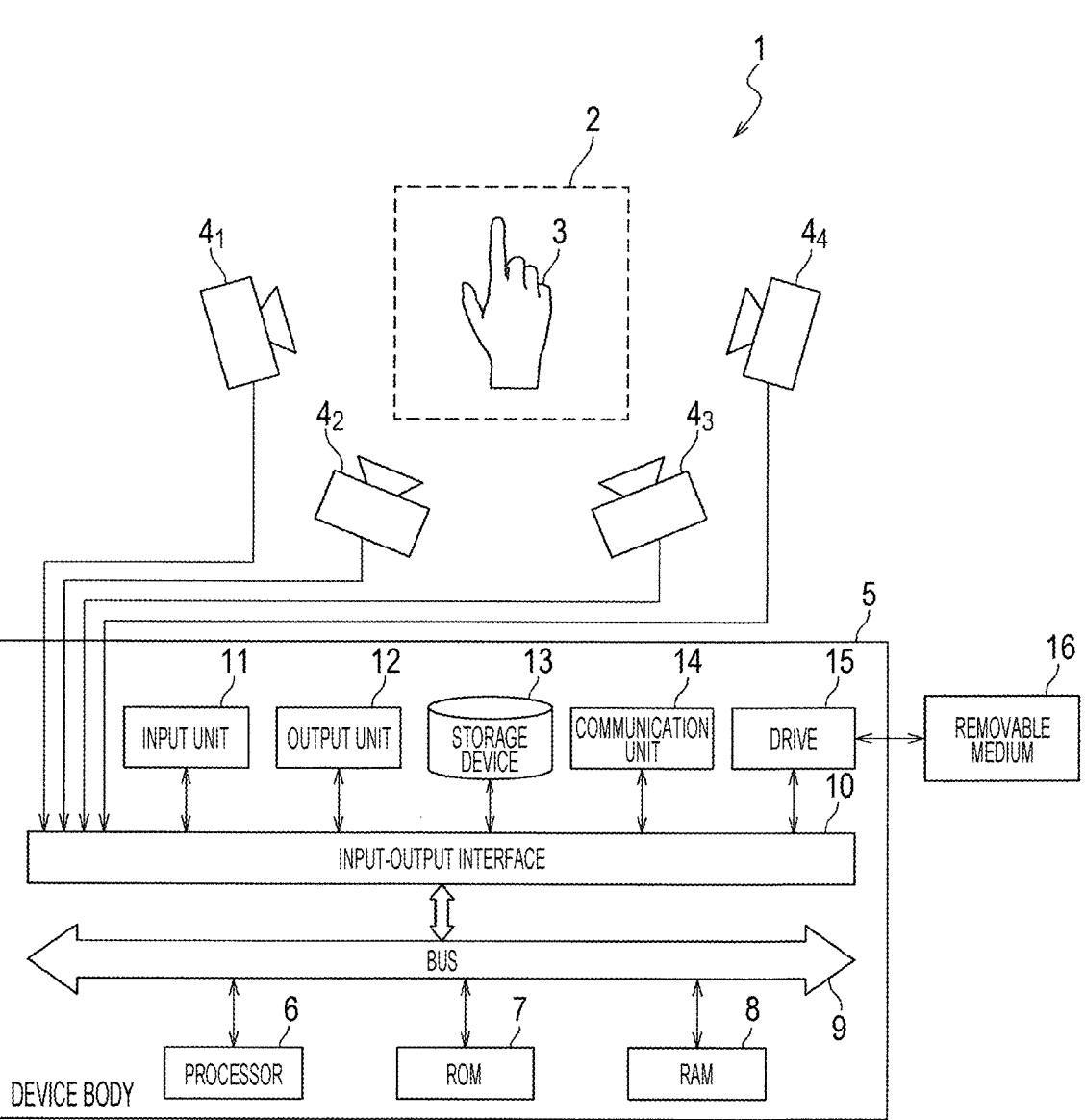
FIG. 1 is a diagram illustrating an overall configuration of an information processing apparatus according to the present embodiment.

FIG. 1 is a diagram illustrating an overall configuration of an information processing apparatus 1 according to the present embodiment. The information processing apparatus 1 in FIG. 1 is a computing device that performs pose estimation of a subject 3 existing in a detection space 2 and determines erroneous recognition by comparing estimation results. The subject 3 is only required to be, for example, any subject such as a hand, an entire body, or a doll that can take a pose. In the present embodiment, a case where "hand 3" is used as "subject 3" will be described. In addition, the erroneous recognition means that there is a certain level or more of difference between the shape of the actual subject 3 (hand 3) and a shape of the subject 3 (hand 3) obtained by the pose estimation, corresponding to the shape of the actual subject 3. Examples of the erroneous recognition include erroneous recognition due to the fact that a recognizer cannot correctly recognize an input image (hereinafter, also referred to as "erroneous recognition caused by the recognizer") and erroneous recognition due to a problem in the input image (hereinafter, also referred to as "erroneous recognition caused by the input image").

As illustrated in FIG. 1, the information processing apparatus 1 includes a plurality of imaging units (for example, four imaging units 4₁, 4₂, 4₃, and 4₄) and a device body (hereinafter, also referred to as "device body 5").

Each of the imaging units $4_1$ to $4_4$ is a device that sequentially outputs depth images indicating distances to an object existing in the detection space 2. The depth image is an image indicating a depth value (distance) to an object for each pixel, and is also called a distance image. FIG. 1 exemplifies a case where each of the imaging units $4_1$ to $4_4$ is disposed at different positions around the detection space 2 and generates a depth image indicating a distance to the subject 3 (hand 3) existing in the detection space 2. As the imaging units $4_1$ to $4_4$, for example, a time of flight (TOF) sensor that generates a depth image, a stereo camera (RGB stereo camera or IR stereo camera) that captures two images with two cameras and generates a depth image from parallax of the captured two images, and a structured light that projects a pattern and captures the projected pattern with a camera at another angle to generate a depth image from distortion of the pattern can be adopted. FIG. 1 exemplifies a case where the TOF sensor is adopted as the imaging units $4_1$ to $4_4$. The generated depth image is output to the device body 5.

The device body 5 includes a processor 6, a random access memory (ROM) 7, a random access memory (RAM) 8, and the like. The processor 6, the ROM 7, and the RAM 8 are connected to each other by a bus 9. An input-output interface 10 is further connected to the bus 9. Furthermore, the input-output interface 10 is connected with the imaging units $4_1$ to $4_4$, an input unit 11 including a keyboard, a mouse, a microphone, and the like, an output unit 12 including a display, a speaker, and the like, a storage device 13 including a hard disk, a solid state drive, and the like, a communication unit 14 including a network interface and the like, and a drive 15 that drives a removable medium 17 such as a magnetic disk, an optical disk, a magneto-optical disk, or a semiconductor memory.

The storage device 13 is a secondary storage device including a hard disc drive (HDD), a solid state drive (SSD), and the like. The storage device 13 memorizes a program that is executable by the processor 6 and is executed by the information processing apparatus 1. The program is provided by being recorded in the removable medium 17, which is a package medium including, for example, a magnetic disk (including a flexible disk), an optical disk (a compact disc-read only memory (CD-ROM), a digital versatile disc (DVD), and the like), a magneto-optical disk, a semiconductor memory, and the like. Alternatively, the information may be provided via a wired or wireless transmission medium such as a local area network, the Internet, or digital broadcasting, for example. Then, the program can be installed in the storage device 13 via the input-output interface 10 and the bus 9 by attaching the removable medium 17 to the drive 15. In addition, the program can be received by the communication unit 14 via a wired or wireless transmission medium and installed in the storage device 13. Note that the program may be installed in the ROM 7 or the storage device 13 in advance. Furthermore, the storage device 13 memorizes various data (for example, a 3D CG model of the subject 3 (hand 3) prepared in advance, which is used for processing to be described later) necessary for executing the program.

Figure 2:
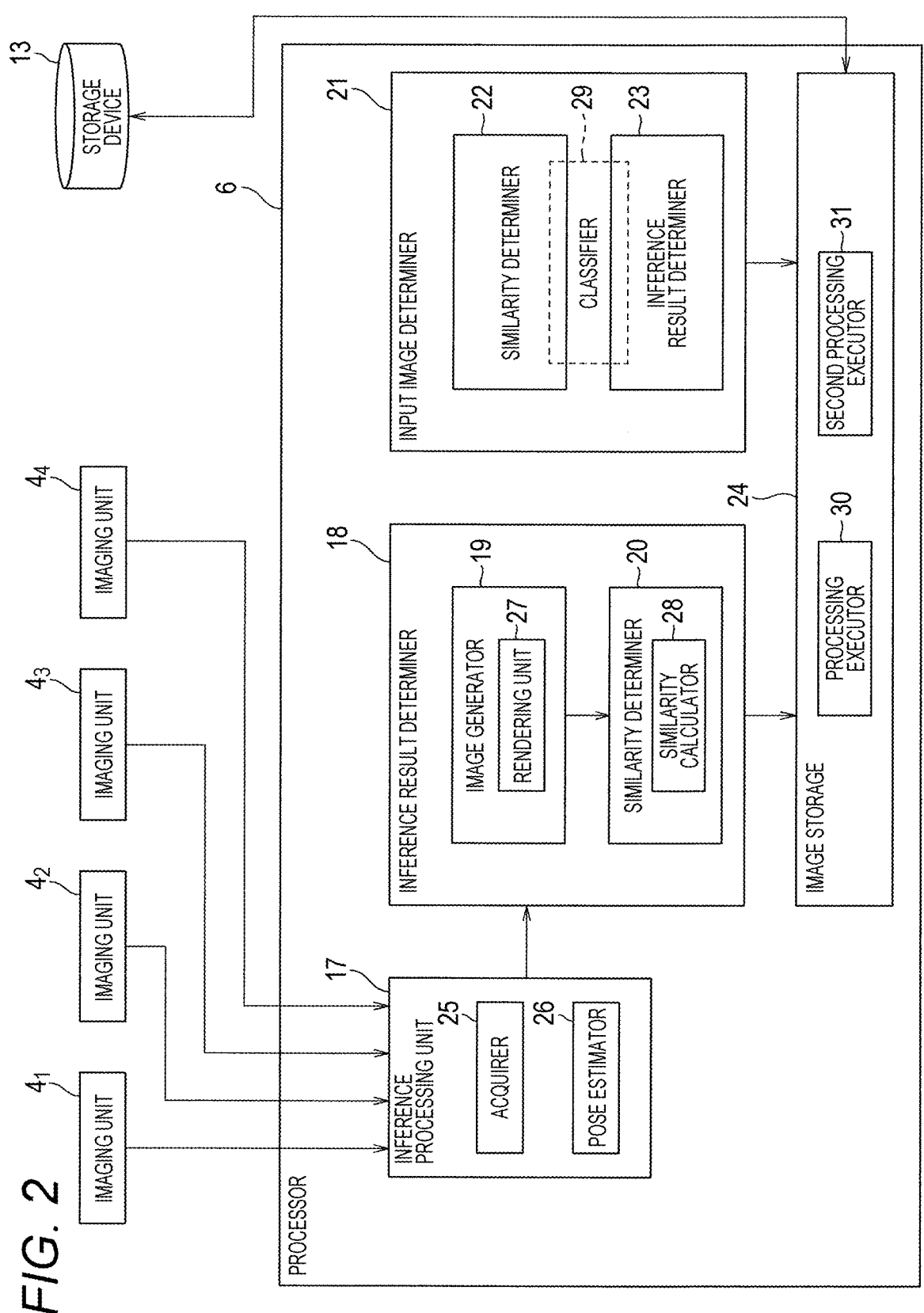
FIG. 2 is a diagram illustrating a functional configuration of an inference processing unit and the like achieved by a processor.

In addition, the processor 6 includes various processors such as a central processing unit (CPU), an application specific integrated circuit (ASIC), a field-programmable gate array (FPGA), and the like. The processor 6 loads a program and the like memorized in the storage device 13 into the RAM 8 and executes the program and the like, performs computation of various processing, logical determination, and the like, and controls each configuration (for example, the storage device 13 and the like) connected to the bus 9. For example, the processor 6 implements functions of the inference processing unit 17, an inference result determiner 18 (including image generator 19 and similarity determiner 20), an input image determiner 21 (including a similarity determiner 22 and an inference result determiner 23), an image storage 24, and the like as illustrated in FIG. 2 in accordance with the program memorized in the storage device 13. The inference processing unit 17 includes an acquirer 25 and a pose estimator 26. Similarly, the image generator 19 includes a rendering unit 27. In addition, the similarity determiner 20 includes a similarity calculator 28. In addition, the similarity determiner 22 and the inference result determiner 23 constitute a classifier 29. Furthermore, the image storage 24 includes a processing executor 30 and a second processing executor 31.

Then, the processor 6 executes depth image collection processing in which the acquirer 25, the pose estimator 26, the rendering unit 27, the similarity calculator 28, the classifier 29, the processing executor 30, and the second processing executor 31 perform pose estimation of the subject 3 (hand 3) that has entered the detection space 2 on the basis of the depth images output from the imaging units 4_1 to 4_4, compare estimation results to determine erroneous recognition, and store the depth images upon detection as erroneous recognition in the storage device 13.

2. Contents of Depth Image Collection Processing

Figure 3:
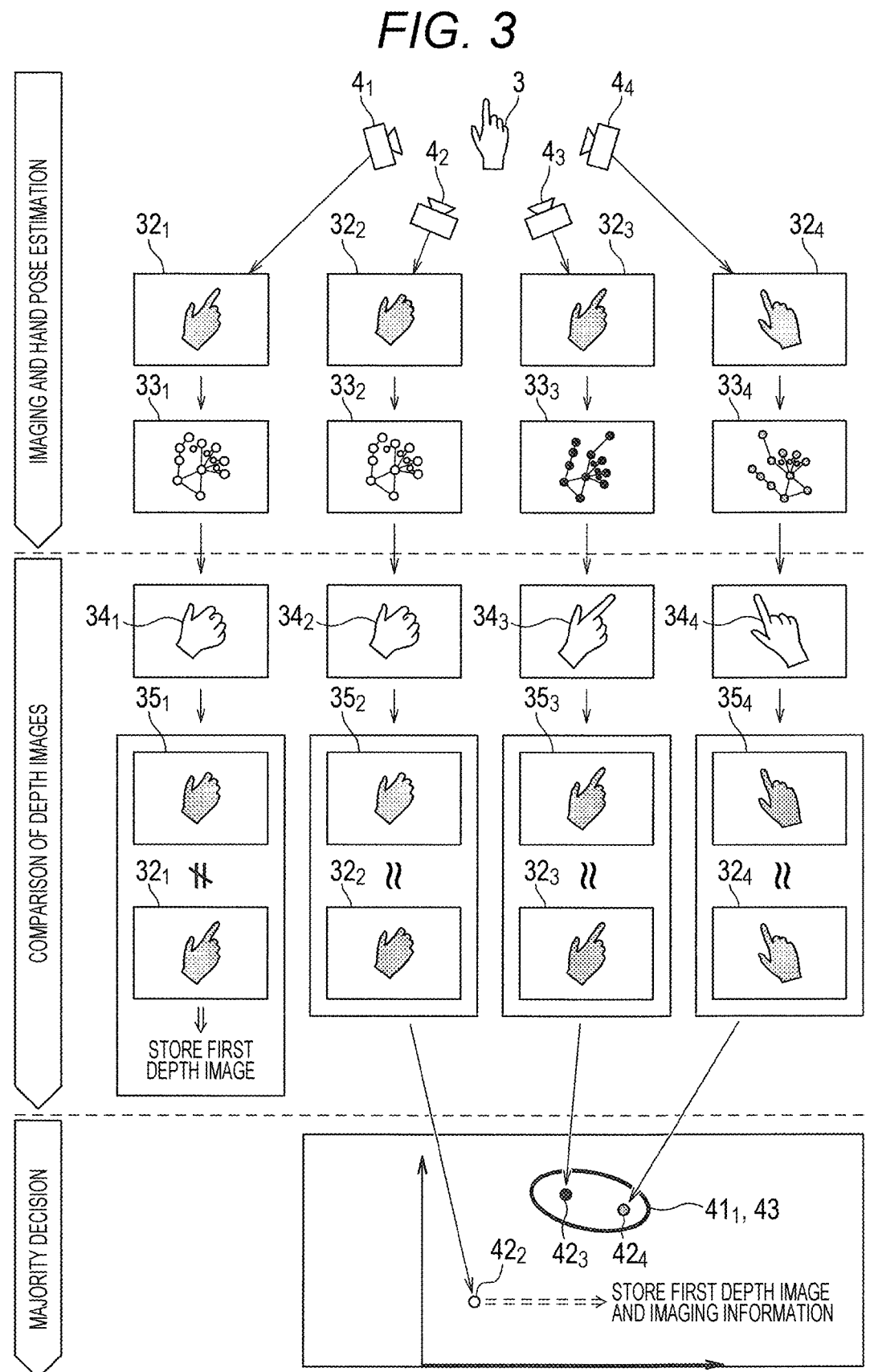
FIG. 3 is a diagram illustrating an outline of processing contents of depth image collection processing.

Next, the depth image collection processing executed by the acquirer 25, the pose estimator 26, the rendering unit 27, the similarity calculator 28, the classifier 29, the processing executor 30, and the second processing executor 31 will be described. The depth image collection processing is executed when the hand 3 enters the detection space 2. Then, in the depth image collection processing, as illustrated in FIG. 3, "imaging and hand pose estimation", "comparison of depth images", and "majority decision" are performed in this order. FIG. 3 exemplifies a case where the pose of the hand 3 is a pose in which the thumb and the forefinger are extended and the other fingers (middle finger, ring finger, little finger) are bent.

Figure 4:
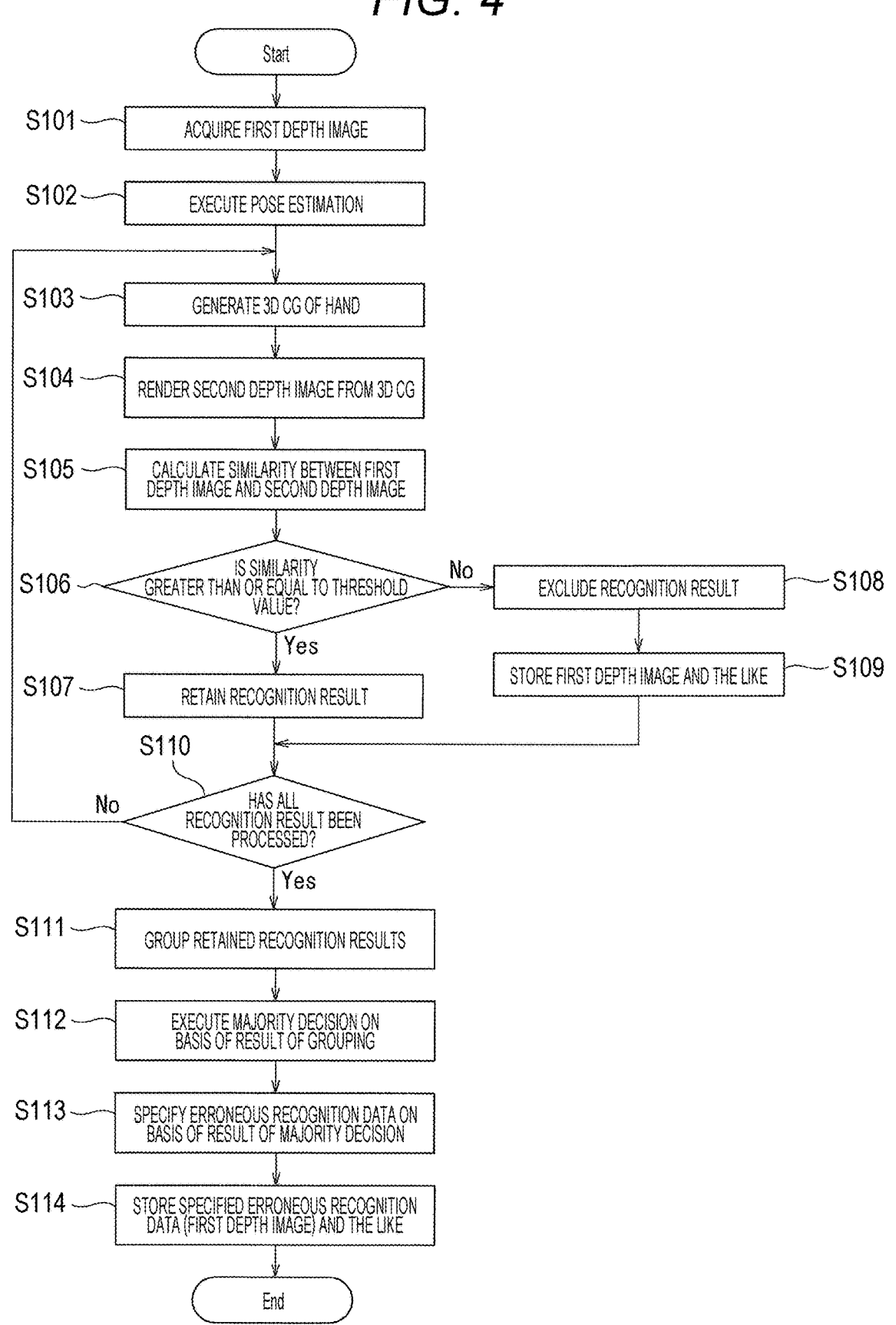
FIG. 4 is a flowchart illustrating an outline of the depth image collection processing.
Figure 5:
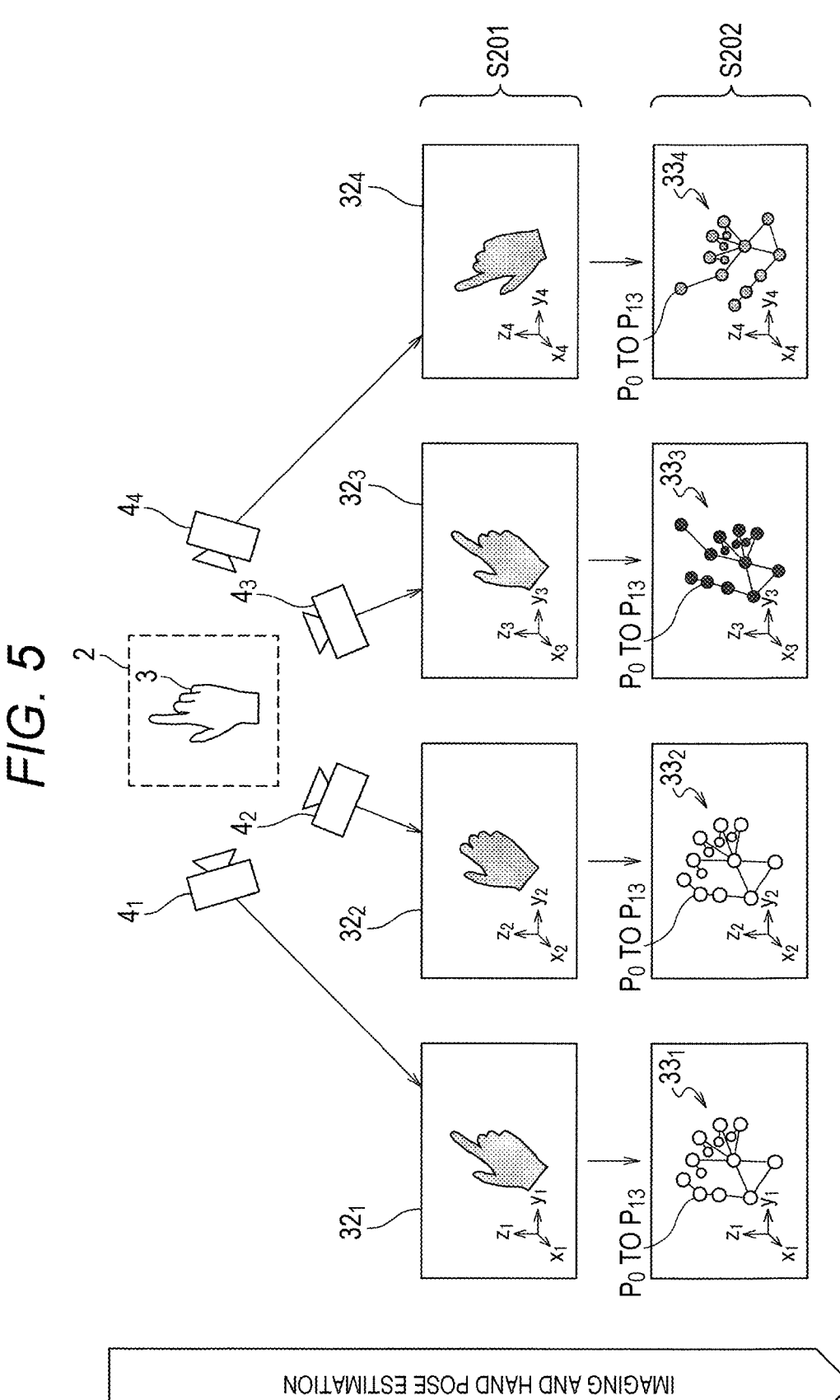
FIG. 5 is a diagram illustrating processing contents of imaging and hand pose estimation in FIG. 4.

As illustrated in FIG. 4, first, in step S101, the acquirer 25 acquires depth images (hereinafter, also referred to as "first depth images 32_1, 32_2, 32_3, and 32_4") of an area including the hand 3 from each of the imaging units 4_1 to 4_4. As a result, as illustrated in step S201 of FIG. 5, the first depth image 32_1 to 32_4 captured from installation positions (in a broad sense, "predetermined positions") of the plurality of imaging units 4_1 to 4_4 are acquired. FIG. 5 is a diagram illustrating processing contents of the "imaging and hand pose estimation" in FIG. 3. FIG. 5 exemplifies the first depth images 32_1, 32_2, and 32_3 captured by the imaging units 4_1, 4_2, and 4_3 disposed on a side of the back of the hand 3 and inclined leftward of the direction indicated by the index finger, and the first depth image 32_j in a case where the imaging unit 4_4 disposed on the side of the back of the hand 3 and inclined rightward of the direction indicated by the index finger is disposed. Furthermore, the first depth image 32_2 exemplifies a case where a portion ahead of the third joint of the index finger is not appropriately imaged and is assimilated with a background portion.

Subsequently, the processing proceeds to step S102, and the pose estimator 26 executes pose estimation of the hand 3 on the basis of the first depth images 32_1 to 32_4 acquired in step S101. For example, as illustrated in step S202 of FIG. 5 and in FIG. 6, for each of the acquired first depth images

Figure 6:
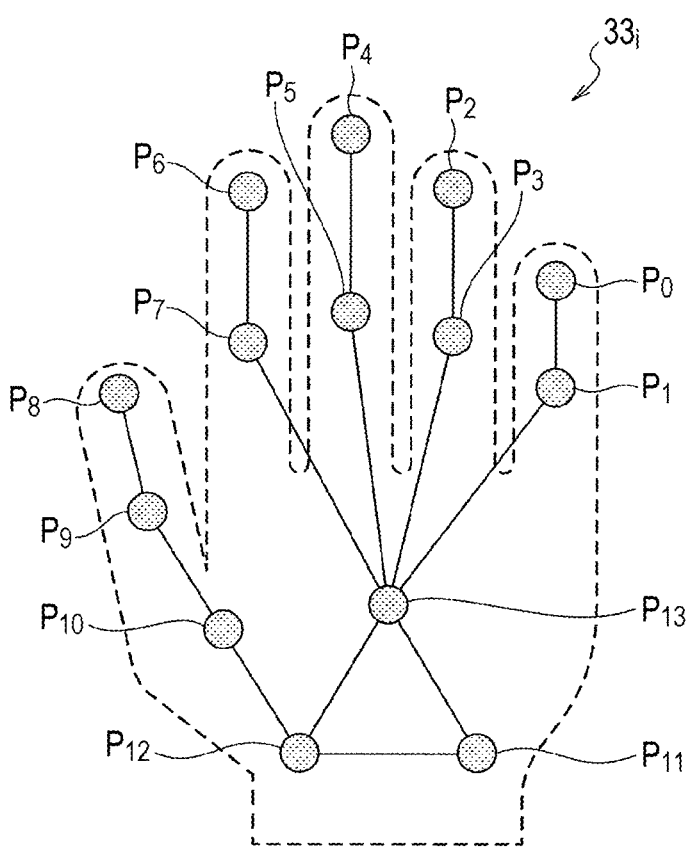
FIG. 6 is a diagram illustrating positions of joint points.

32_i (i=1, 2, 3, or 4), a set of coordinates (hereinafter, also referred to as "coordinate group 33_i") of a plurality of feature points (hereinafter, also referred to as "joint points $P_0$, $P_1$, $P_2$, $P_3$, $P_4$, $P_5$, $P_6$, $P_7$, $P_8$, $P_9$, $P_{10}$, $P_{11}$, $P_{12}$, $P_{13}$, $P_{14}$") predetermined for the hand 3 is estimated on the basis of the first depth image 32_i. FIG. 6 exemplifies a case where the number of joint points $P_0$ to $P_{13}$ is 14. As the joint points $P_0$ to $P_{13}$, for example, a fingertip, a joint (including joints of the hand and fingers and the joint of the wrist), and a center of the back of the hand can be adopted. Furthermore, as the coordinates, for example, coordinates in a coordinate system (hereinafter, also referred to as a "local coordinate system $x_i y_i z_i$") unique to the first depth image 32_i used for estimation of the coordinate group 33_i can be adopted.

As a method of estimating the coordinates (coordinate group 33_i) of the joint points $P_0$ to $P_{14}$, for example, a method of estimating the coordinates of the joint points $P_0$ to $P_{14}$ of the hand 3 on the basis of the first depth image 32_i acquired in step S101 by using a recognizer learned by teacher data including a depth image of the hand and the coordinates of the joint points $P_0$ to $P_{14}$ in the depth image can be adopted. According to the method using the recognizer, the coordinates of the joint points $P_0$ to $P_{14}$ can be easily estimated by inputting the first depth image 32_i acquired from the imaging unit 4_i to the recognizer. FIG. 5 exemplifies a case where a joint point group in which all the fingers are folded is obtained as the coordinate groups 33_1 and 33_2, and a case where a joint point group in which the index finger and the thumb are extended and the other fingers are folded is obtained as the coordinate groups 33_3 and 33_4. That is, a case where the shape of the hand 3 by the coordinate groups 33_1 and 33_2 is different from the pose of the actual hand 3 and is erroneously recognized is exemplified. Particularly, it can be said that the coordinate group 33_1 is erroneously recognized due to the recognizer, and the coordinate group 33_2 is erroneously recognized due to the first depth image 32_2.

Next, the processing proceeds to step S103, and the rendering unit 27 selects one coordinate group 33_j (j=1, 2, 3, or 4) from the coordinate group 33_1 to 33_4 estimated in step S102.

Figure 7:
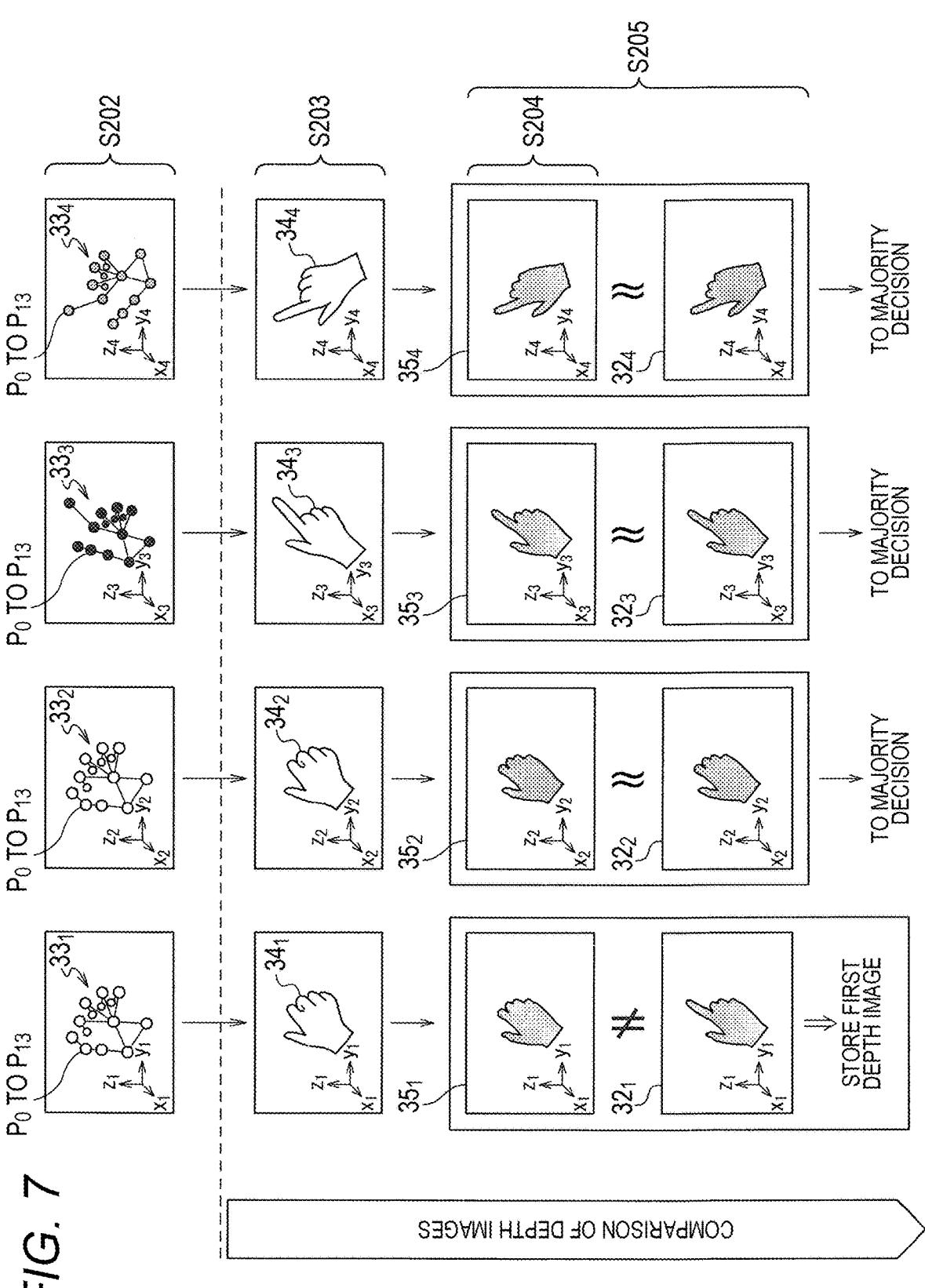
FIG. 7 is a diagram illustrating processing contents of comparison of depth images in FIG. 4.

Subsequently, as illustrated in step S203 in FIG. 7, a three dimensional computer graphics (3D CG) model 34_j of the hand 3 is generated on the basis of the coordinates of the joint points $P_0$ to $P_{13}$ of the selected coordinate group 33_j. For example, a 3D CG model of the hand 3 prepared in advance (for example, a 3D CG model of the hand 3 having a size assumed for a standard user and taking a predetermined pose) is read from the storage device 13, the read 3D CG model is deformed so that the coordinates of the joint points $P_0$ to $P_{14}$ of the 3D CG model coincide with the coordinates of the joint points $P_0$ to $P_{14}$ of the selected coordinate group 33_j, and thus the 3D CG model 34_j of the hand 3 is generated in the local coordinate system $x_i y_i z_i$. The method of deforming the 3D CG model of the hand 3 prepared in advance can facilitate generation of the 3D CG model 34_j. FIG. 7 is a diagram illustrating processing contents of the comparison of depth images in FIG. 3.

Subsequently, the processing proceeds to step S104, and as illustrated in step S204 of FIG. 7, the rendering unit 27 renders a depth image (hereinafter, also referred to as a "second depth image 35_j") obtained by imaging the 3D CG model 34_j generated in step S103 with a virtual camera. As the virtual camera, for example, a camera positioned at the origin (0, 0, 0) of the local coordinate system $x_i y_i z_i$ and directed in the same direction as the direction of the imaging unit 4_j in the local coordinate system $x_i y_i z_i$ can be adopted.

Subsequently, the processing proceeds to step S105, and as illustrated in step S205 of FIG. 7, the similarity calculator 28 calculates similarity between the first depth image $32_j$ acquired in step S101 and the second depth image $35_j$ rendered in step S104. As the similarity, for example, a sum of squared difference (SAD) value and a histogram difference can be adopted.

Next, the processing proceeds to step S106, and the processing executor 30 determines whether the similarity calculated in step S105 is greater than or equal to a predetermined threshold value $T_H$. Then, upon determination that the similarity is greater than or equal to the predetermined threshold value $T_H$ (Yes), the processing proceeds to step S107. On the other hand, upon determination that the similarity is less than the predetermined threshold value $T_H$ (No), the processing proceeds to step S108.

According to steps S105 and S106, for example, in a case where the estimation results of the coordinates of the joint points $P_0$ to $P_{13}$ are correct, the 3D CG model $34_j$ similar to the actual hand 3 is generated, the second depth image $35_j$ similar to the first depth image $32_i$ is generated, and the similarity between the first depth image 32 and the second depth image $35_j$ increases. Therefore, in a case where the estimation results of the coordinates of the joint points $P_0$ to $P_{13}$ are correct, the determination in step S106 is "Yes", and the processing proceeds to step S107.

On the other hand, for example, in a case where the estimation results of the coordinates of the joint points $P_0$ to $P_{13}$ are wrong, the 3D CG $34_j$ having a shape different from the actual hand 3 is generated, the second depth image $35_j$ different from the first depth image $32_j$ is generated, and the similarity between the first depth image $32_j$ and the second depth image $35_j$ decreases. Therefore, in a case where the estimation results of the coordinates of the joint points $P_0$ to $P_{13}$ are wrong, the determination in step S106 is "No", and the processing proceeds to step S108. In other words, it can be said that whether erroneous recognition has occurred is determined by determining whether the similarity is greater than or equal to the predetermined threshold value $T_H$. FIG. 7 exemplifies a case where the similarity between the first depth image $32_1$ and the second depth image $35_1$ is lower than the predetermined threshold value $T_H$ due to the erroneous recognition caused by the recognizer as described above.

In step S107, the processing executor 30 retains a recognition result (coordinate group $33_j$) selected in step S103, and then the processing proceeds to step S110. For example, a flag indicating retention is set in the coordinate group $33_j$. As a result, the coordinate group $33_j$ estimated on the basis of the first depth image $32_j$ having the similarity calculated in step S105 greater than or equal to the predetermined threshold value $T_H$ is extracted from the coordinate groups $33_j$ estimated in step S102. In other words, it can also be said that the coordinate group $33_j$ in which erroneous recognition caused by the recognizer is determined not to have occurred is extracted from the estimated coordinate groups $33_j$. FIG. 7 exemplifies a case where there is no erroneous recognition caused by the recognizer, the similarity is greater than or equal to the predetermined threshold value $T_H$, and the coordinates of the joint points $P_0$ to $P_{13}$ of the coordinate groups $33_2$, $33_3$, and $33_4$ are retained.

On the other hand, in step S108, the processing executor 30 excludes a recognition result (coordinate group $33_j$) selected in step S103 from the "majority decision". For example, a flag indicating exclusion is set in the coordinate group $33_j$. FIG. 7 exemplifies a case where the similarity becomes lower than the predetermined threshold value $T_H$ due to erroneous recognition caused by the recognizer, and the coordinates of the joint points $P_0$ to $P_{13}$ of the coordinate group $33_1$ are excluded.

Subsequently, the processing proceeds to step S109, the processing executor 30 stores the first depth image $32_j$ used for determination in step S106 in the storage device 13, and then the processing proceeds to step S110. As a result, the first depth image $32_j$ can be automatically collected when the estimation results of the coordinates of the joint points $P_0$ to $P_{13}$ of the hand 3 are wrong due to the erroneous recognition caused by the recognizer as described above. FIG. 7 exemplifies a case where it is determined that the similarity between the first depth image $32_1$ and the second depth image $35_1$ is lower than the predetermined threshold value $T_H$, and the first depth image $32_1$ used for the determination is stored.

Figures 8, 9:
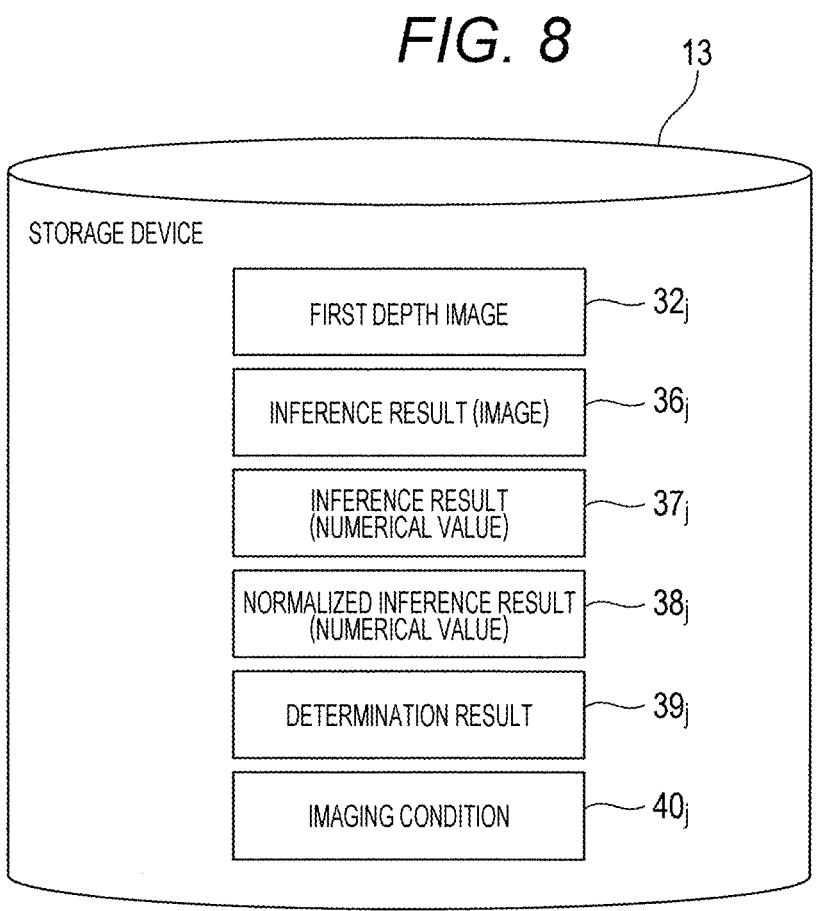
FIG. 8 is a diagram illustrating data such as a first depth image stored in a storage device.
FIG. 9 is a diagram illustrating processing contents of majority decision in FIG. 4.

In addition, as illustrated in FIG. 8, together with the first depth image $32_j$, the storage device 13 stores an inference result (image) $36_j$, an inference result (numerical value) $37_j$, a normalized inference result (numerical value) $38_j$, a determination result $39_j$, and an imaging condition $40_j$. The inference result (image) $36_j$ is an image visualized by superimposing the joint points $P_0$ to $P_{13}$ whose coordinates have been estimated in step S102 on the first depth image $32_j$. Furthermore, the inference result (numerical value) $37_j$ is a file that stores the coordinates of the joint points $P_0$ to $P_{13}$ of the coordinate group $33_j$ estimated in step S102. As a file format, a text format or a binary format can be adopted. Furthermore, the normalized inference result (numerical value) $38_j$ is a file that stores the coordinates of the joint points $P_0$ to $P_{13}$ of the coordinate group $33_j$ having been subjected to normalization processing. As a file format, a text format or a binary format can be adopted. In addition, the determination result $39_j$ is information indicating erroneous recognition caused by the recognizer or erroneous recognition caused by the input image. Furthermore, the imaging condition $40_j$ is information regarding an imaging condition such as an installation position and an imaging mode of the imaging unit $4_j$, and is information used to improve the imaging condition when erroneous recognition caused by an input image occurs. As a result, by using the first depth image $32_j$ (the first depth image $32_j$ that has been erroneously recognized) stored in the storage device 13 for learning of the recognizer, the first depth image $32_j$ that has been erroneously recognized can be intensively learned, and the performance of the recognizer can be efficiently improved. It is therefore possible to reduce erroneous recognition caused when the recognizer cannot correctly recognize the input image, that is, erroneous recognition caused by the recognizer.

In other words, it can be said that the processing according to the similarity between the first depth image $32_j$ and the second depth image $35_j$ is executed by steps S106 and S108.

In step S110, the processing executor 30 determines whether all the recognition results (coordinate group $33_j$) obtained in step S102 have been processed. Specifically, it is determined in step S103 whether all the coordinate groups $33_1$ to $33_4$ have been selected. Then, upon determination that all the coordinate groups $33_1$ to $33_4$ have been processed (selected) (Yes), the processing proceeds to step S111. On the other hand, upon detection that some of the coordinate groups $33_1$ to $33_4$ have not been processed (not selected) (No), the processing returns to step S103.

In step S111, the classifier 29 groups the recognition results (coordinate group $33_k$ (k=one or more of 1, 2, 3, and 4)) retained in step S107. For example, the coordinate group $33_k$ extracted in step S107 (hereinafter also referred to as an "extracted coordinate group $33_k$") is classified into a group $41_m$ (m=one or more of 1, 2, 3, and 4) for each similar coordinate group. Specifically, as illustrated in step S206 of FIG. 9, the extracted coordinate group $33_k$ is classified into the group $41_m$ by clustering by using the coordinates of the joint points $P_0$ to $P_{13}$ included in the extracted coordinate group $33_k$. Particularly, first, for each extracted coordinate group $33_k$, normalization processing is performed on the coordinates of the joint points $P_0$ to $P_{13}$ included in the extracted coordinate group $33_k$. Subsequently, the classifier 29 maps each extracted coordinate group $33_k$ having been subjected to the normalization processing as a point $42_k$ in a multidimensional space. As the multidimensional space, for example, a (number of joint points $P_0$ to $P_{13}$×3) dimensional space can be adopted. Subsequently, the extracted coordinate group $33_k$ is classified into the group $41_m$ by clustering the mapped points $42_k$. As a clustering method, for example, hierarchical clustering can be adopted. In the hierarchical clustering, the points $42_k$ and the groups (clusters) in which a distance between the groups is less than or equal to a threshold value are grouped into the same cluster. FIG. 9 is a diagram illustrating processing contents of the majority decision in FIG. 3.

Examples of the normalization processing include first, second, third, and fourth normalization processing. Among these normalization processing, the first, second, and third normalization processing are processing of, for each extracted coordinate group $33_k$, translating the positions of the joint points $P_0$ to $P_{13}$ with respect to the coordinates of the joint points $P_0$ to $P_{13}$ included in the extraction coordinate group $33_k$ such that a predetermined position (for example, the center of the joint of the wrist) specified by the coordinates coincides with the origin (0, 0, 0) of a local coordinate system $x_k y_k z_k$ indicating the extracted coordinate group $33_k$, and rotating the positions of the joint points $P_0$ to $P_{13}$ about the origin (0, 0, 0) such that the hand 3 indicated by the extracted coordinate group $33_k$ faces a predetermined direction of the local coordinate system $x_k y_k z_k$ after the translation.

Figure 10:
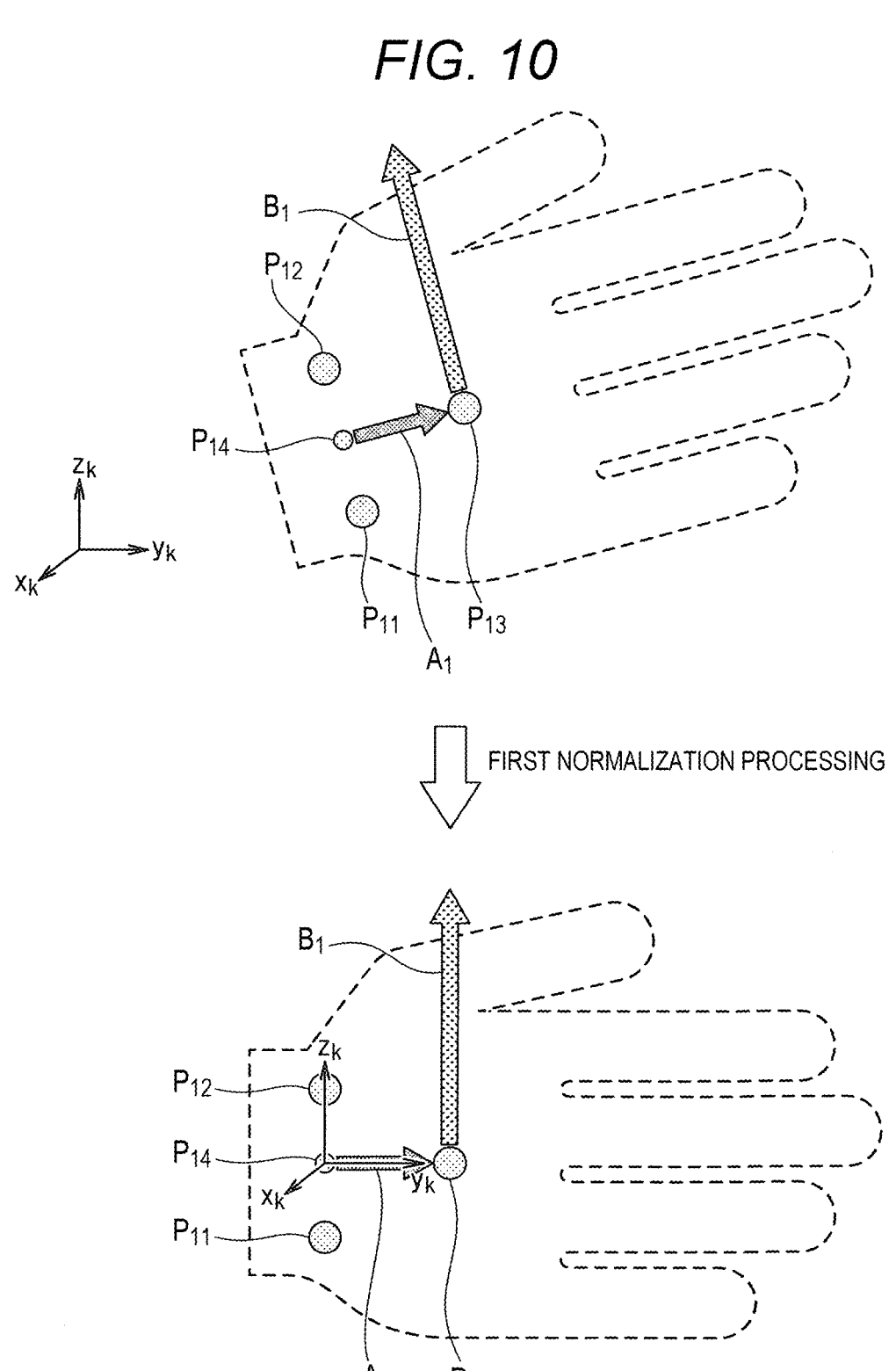
FIG. 10 is a diagram illustrating processing contents of first normalization processing.

In the first normalization processing, on the basis of the coordinates of the joint points $P_0$ to $P_{13}$, the positions of the joint points $P_0$ to $P_{13}$ are rotated such that a vector $A_1$ extending from the wrist toward the fingertip of the hand 3 indicated by the extracted coordinate group $33_k$ is directed in a first direction in the local coordinate system $x_k y_k z_k$, and a normal vector $B_1$ of the back of the hand is along a second direction forming 90 degrees with the first direction in the local coordinate system $x_k y_k z_k$. For example, as illustrated in FIG. 10, first, a joint point $P_{14}$ which is a midpoint between the joint point $P_{11}$ and the joint point $P_{12}$ is calculated. The joint points $P_{11}$ and $P_{12}$ are a right side portion and a left side portion of the joint of the wrist. Next, the positions of the joint points $P_0$ to $P_{14}$ are each translated so that the joint point $P_{14}$ coincides with the origin (0, 0, 0) of the local coordinate system $x_k y_k z_k$. Then, a vector extending from the joint point $P_{14}$ to the joint point $P_{13}$ is calculated and set as the vector $A_1$ extending from the wrist toward the fingertip. The joint point $P_{13}$ is the center of the back of the hand. Subsequently, the positions of the joint points $P_0$ to $P_{13}$ are each rotated about the joint point $P_{14}$ such that the vector $A_1$ is along a unit vector (0, 1, 0) in a $y_k$ direction (in a broad sense, "the first direction in the local coordinate system $x_k y_k z_k$"). Thereafter, a vector indicated by an outer product of a vector extending from the joint point $P_{13}$ to the joint point $P_{12}$ and a vector extending from the joint point $P_{13}$ to the joint point $P_{11}$ is calculated and set as the normal vector $B_1$ of the back of the hand.

Subsequently, the positions of the joint points $P_0$ to $P_{13}$ are each rotated about the joint point $P_{14}$ such that the normal vector $B_1$ is along a unit vector (0, 0, 1) in a $z_k$ direction (in a broad sense, "the second direction forming 90 degrees with the first direction in the local coordinate system $x_k y_k z_k$"). As a result, the vector $A_1$ extending from the wrist toward the fingertip and the normal vector $B_1$ of the back of the hand can be aligned between the recognition results (between the extracted coordinate groups $33_k$), and the direction can be normalized. Note that in any combination for acquiring the vector $A_1$ extending from the wrist toward the fingertip and the normal vector $B_1$ of the back of the hand, the joint points $P_0$ to $P_{13}$ used in the first normalization processing except for the joint points $P_{11}$, $P_{12}$, and $P_{13}$ may be used.

Figure 11:
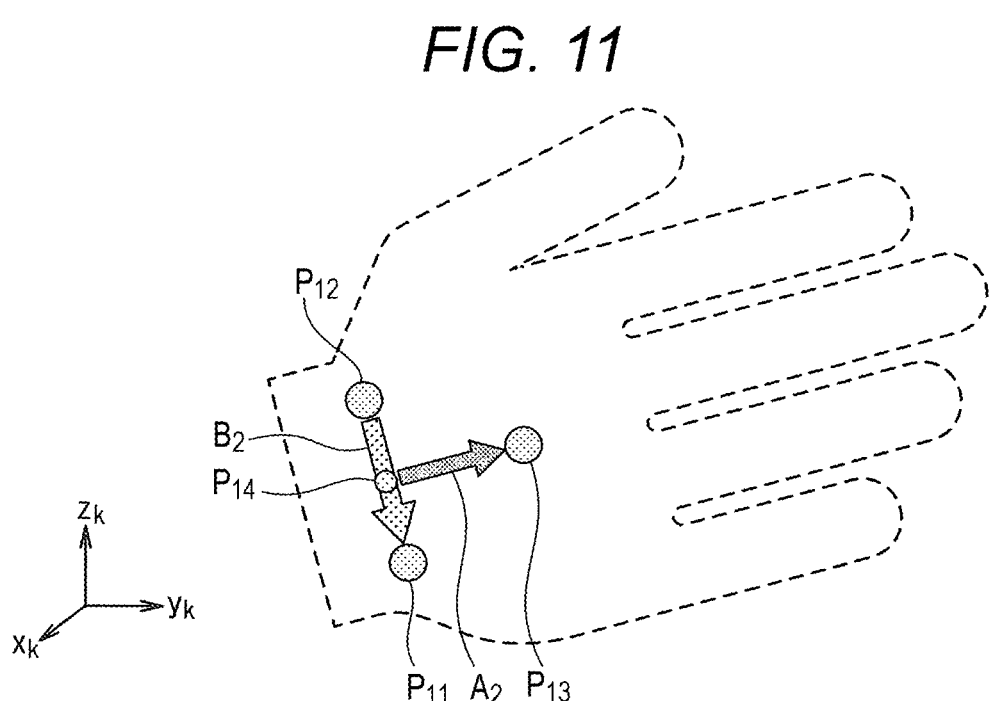
FIG. 11 is a diagram illustrating processing contents of second normalization processing.
Figure 11:
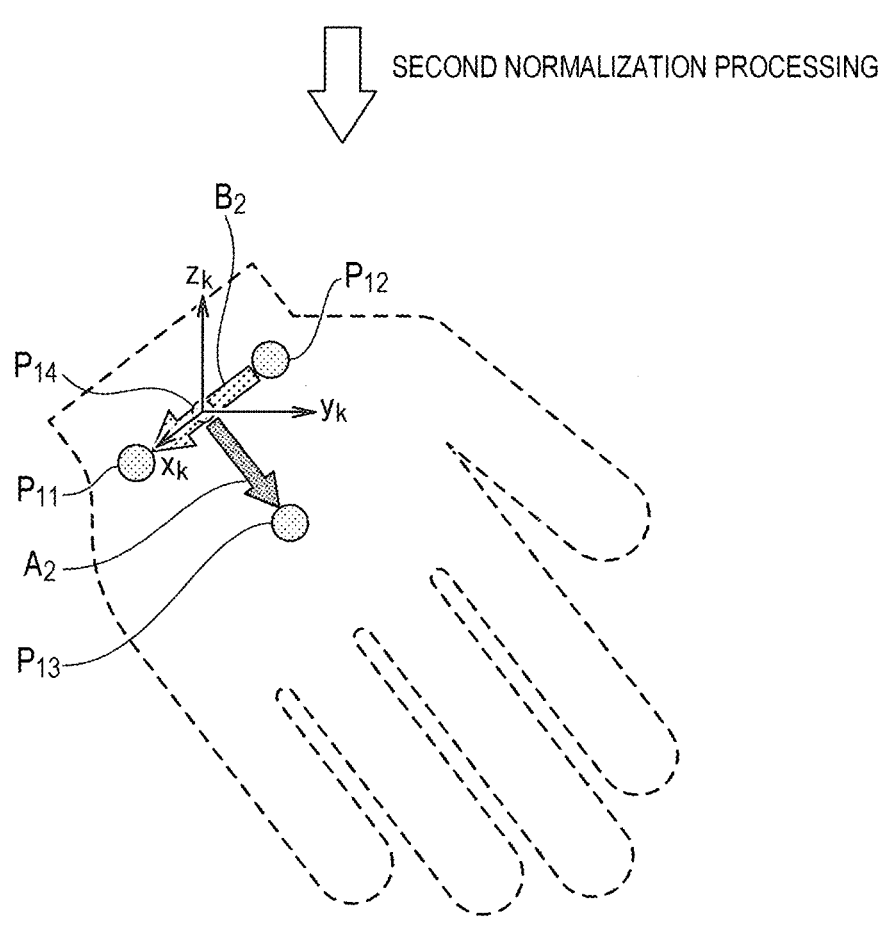

Furthermore, in the second normalization processing, on the basis of the coordinates of the joint points $P_0$ to $P_{13}$, the positions of the joint points $P_0$ to $P_{13}$ are rotated such that a vector $A_2$ extending from the wrist toward the fingertip of the hand 3 indicated by the extracted coordinate group $33_k$ is directed in a first direction in the local coordinate system $x_k y_k z_k$, and a vector $B_2$ extending from the thumb toward the little finger is along a second direction forming 90 degrees with the first direction in the local coordinate system $x_k y_k z_k$. For example, as illustrated in FIG. 11, first, a joint point $P_{14}$ which is a midpoint between the joint point $P_{11}$ and the joint point $P_{12}$ is calculated. Next, the positions of the joint points $P_0$ to $P_{14}$ are each translated so that the joint point $P_{14}$ coincides with the origin (0, 0, 0) of the local coordinate system $x_k y_k z_k$. Then, a vector extending from the joint point $P_{14}$ to the joint point $P_{13}$ is calculated and set as the vector $A_2$ extending from the wrist toward the fingertip. Subsequently, the joint points $P_0$ to $P_{13}$ are each rotated about the joint point $P_{14}$ such that the vector $A_2$ extending from the wrist toward the fingertip is along a unit vector (0, 1, 0) in a $y_k$ direction (in a broad sense, "the first direction in the local coordinate system $x_k y_k z_k$"). Then, a vector extending from the joint point $P_{12}$ to the joint point $P_{11}$ is calculated and set as the vector $B_2$ extending from the thumb toward the little finger. Subsequently, the positions of the joint points $P_0$ to $P_{13}$ are each rotated about the joint point $P_{14}$ such that the vector $B_2$ is along a unit vector (1, 0, 0) in an X direction (in a broad sense, "the second direction forming 90 degrees with the first direction in the local coordinate system $x_k y_k z_k$"). As a result, the vector $A_2$ extending from the wrist toward the fingertip and the vector $B_2$ extending from the thumb toward the little finger can be aligned between the recognition results (between the extracted coordinate groups $33_k$), and the direction can be normalized. Note that in any combination for acquiring the vector $A_2$ extending from the wrist toward the fingertip and the vector $B_2$ extending from the thumb toward the little finger, the joint points $P_0$ to $P_{13}$ used in the second normalization processing except for the joint points $P_{11}$, $P_{12}$, and $P_{13}$ may be used.

Figure 12:
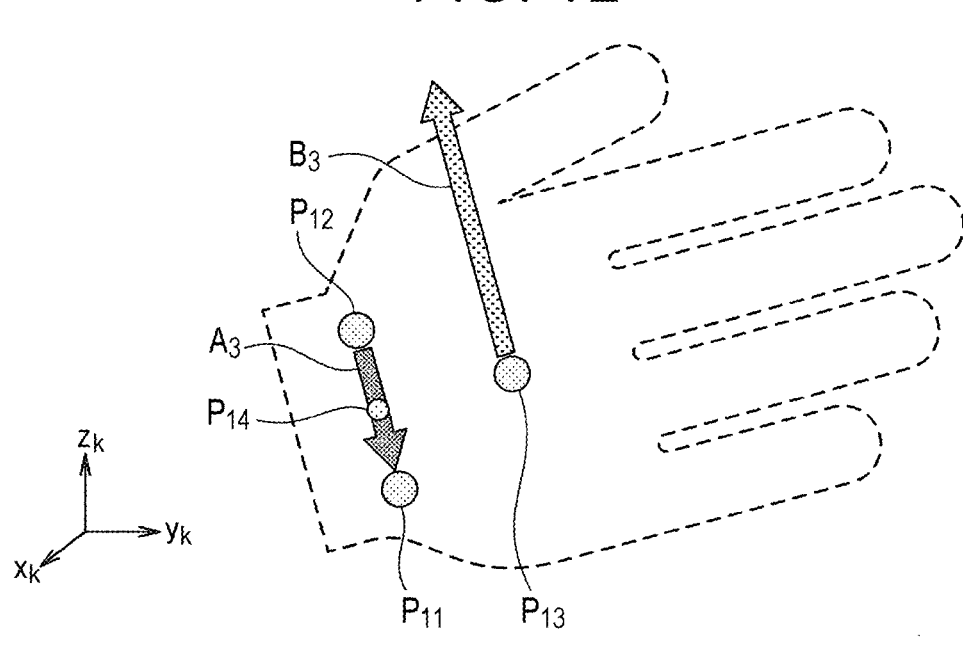
FIG. 12 is a diagram illustrating processing contents of third normalization processing.
Figure 12:
Figure 12:
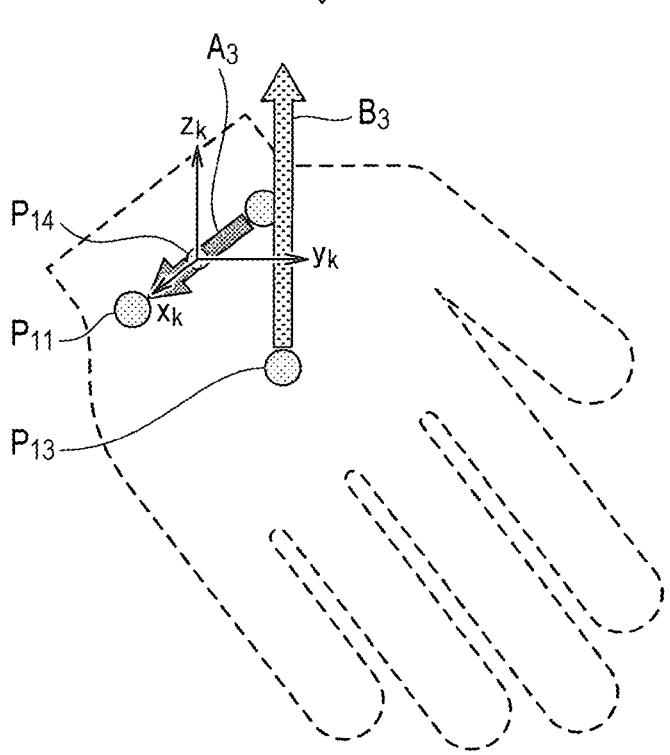

Furthermore, in the third normalization processing, on the basis of the coordinates of the joint points $P_0$ to $P_{13}$, the positions of the joint points $P_0$ to $P_{13}$ are rotated such that a vector $A_3$ extending from the thumb toward the little finger of the hand 3 indicated by the extracted coordinate group $33_k$ is directed in a first direction in the local coordinate system $x_k y_k z_k$, and a normal vector $B_3$ of the back of the hand is along a second direction forming 90 degrees with the first direction in the local coordinate system $x_k y_k z_k$. For example, as illustrated in FIG. 12, first, a joint point $P_{14}$ which is a midpoint between the joint point $P_{11}$ and the joint point $P_{12}$ is calculated. Next, the coordinates of the joint points $P_0$ to $P_{14}$ are each translated so that the joint point $P_{14}$ coincides with the origin (0, 0, 0) of the local coordinate system $x_k y_k z_k$.

Then, a vector extending from the joint point $P_{12}$ to the joint point $P_{11}$ is calculated and set as the vector $A_3$ extending from the thumb toward the little finger. Subsequently, the joint points $P_0$ to $P_{13}$ are each rotated about the joint point $P_{14}$ such that the vector $A_3$ is along a unit vector $(1, 0, 0)$ in an $x_k$ direction (in a broad sense, "the first direction in the local coordinate system $x_k y_k z_k$"). Thereafter, a vector indicated by an outer product of a vector extending from the joint point $P_{13}$ to the joint point $P_{12}$ and a vector extending from the joint point $P_{13}$ to the joint point $P_{11}$ is calculated and set as the normal vector $B_3$ of the back of the hand. Subsequently, the positions of the joint points $P_0$ to $P_{13}$ are each rotated about the joint point $P_{14}$ such that the normal vector $B_3$ is along a unit vector $(0, 0, 1)$ in a $z_k$ direction (in a broad sense, "the second direction forming 90 degrees with the first direction in the local coordinate system $x_k y_k z_k$"). As a result, the vector $A_3$ extending from the thumb toward the little finger and the normal vector $B_3$ of the back of the hand can be aligned between the recognition results (between the extracted coordinate groups $33_k$), and the direction can be normalized. Note that in any combination for acquiring the vector $A_3$ extending from the thumb toward the little finger and the normal vector $B_3$ of the back of the hand, the joint points $P_0$ to $P_{13}$ used in the third normalization processing except for the joint points $P_{11}$, $P_{12}$, and $P_{13}$ may be used.

Figure 13:
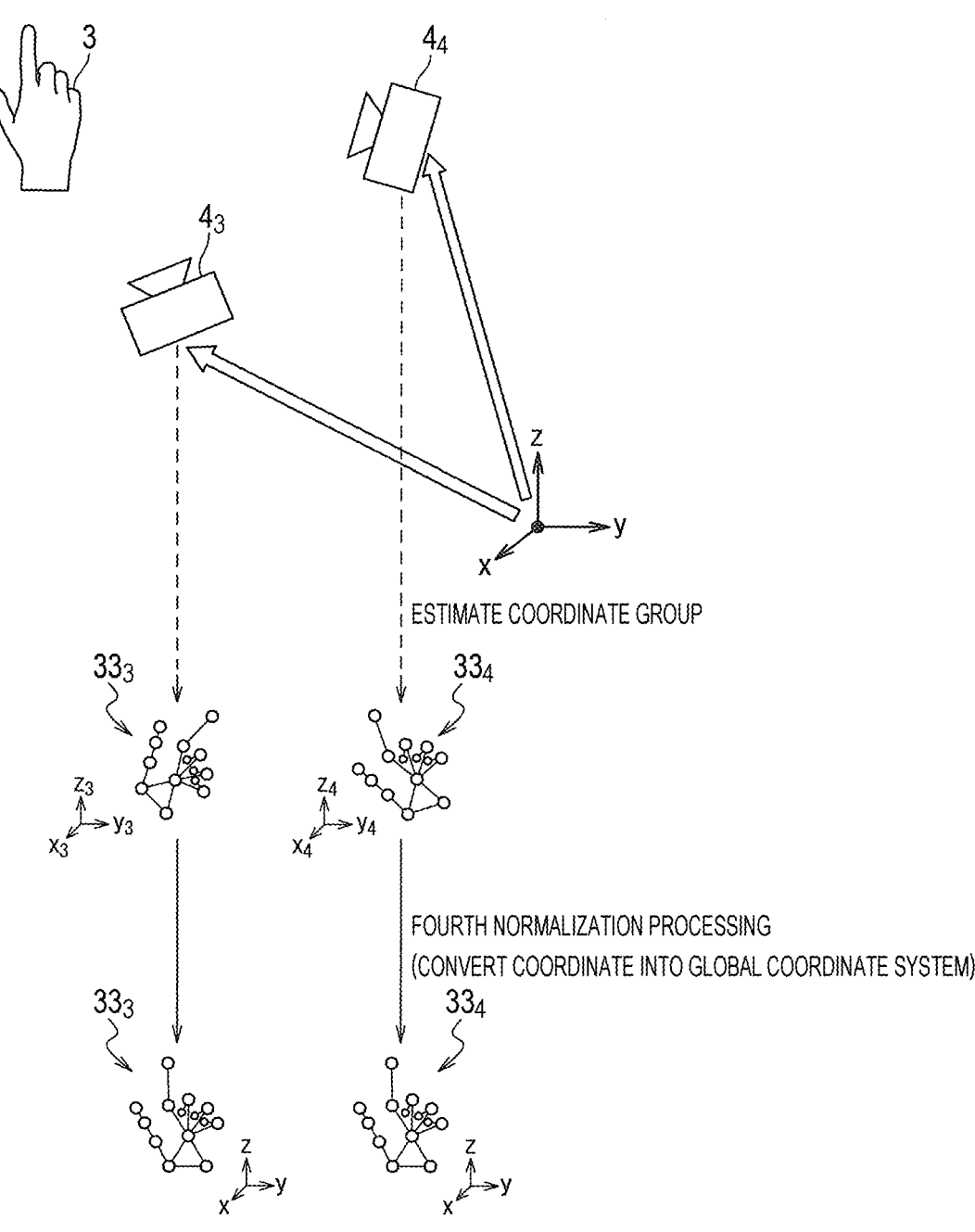
FIG. 13 is a diagram illustrating processing contents of fourth normalization processing.

Furthermore, in the fourth normalization processing, for each extracted coordinate group $33_k$, for the coordinates of the joint points $P_0$ to $P_{13}$ included in the extracted coordinate group $33_k$, the coordinates of the joint points $P_0$ to $P_{13}$ expressed by the local coordinate system $x_k y_k z_k$ indicating the extracted coordinate group $33_k$ are converted into a global coordinate system XYZ. For example, as illustrated in FIG. 13, the coordinates of the joint points $P_0$ to $P_{13}$ of the extracted coordinate group $33_k$ expressed by the local coordinate system $x_k y_k z_k$ are converted into the global coordinate system XYZ by using a coordinate transformation matrix $T_k$ between the local coordinate system $x_k y_k z_k$ and the global coordinate system XYZ. The coordinate transformation matrix $T_k$ can be calculated on the basis of the position and orientation of the imaging unit $4_k$ with the origin $(0, 0, 0)$ of the global coordinate system XYZ as a reference. Note that, in FIG. 13, the imaging units $4_1$ and $4_2$ are not shown for simplification.

Subsequently, the processing proceeds to step S112, and the second processing executor 31 executes majority decision on the basis of the result of the grouping performed in step S111. For example, first, the number of elements (the number of points $42_k$ and the number of extracted coordinate groups $33_k$) is aggregated for each group $41_m$. Subsequently, a group $41_m$ having the largest number of elements among all the groups $41_m$ is specified, and the specified group $41_m$ is set as a correct group 43. Here, for example, the extracted coordinate group $33_k$ in which erroneous recognition caused by the input image has not occurred is classified into the same group $41_m$ (correct group 43). In addition, for example, the extracted coordinate group $33_k$ in which erroneous recognition caused by the input image has occurred is not classified into the correct group 43. Therefore, the correct group 43 is a group $41_m$ to which the extracted coordinate group $33_k$ (point $42_k$) that has a small difference from the shape of the actual hand 3 and is determined to have obtained a correct recognition result belongs. In other words, it can be said that the group $41_m$ to which the recognition result (extracted coordinate group $33_k$) in which the erroneous recognition has not occurred belongs is specified by specifying the group $41_m$ having the largest number of elements. FIG. 9 exemplifies a case where the group $41_1$ to which the points $42_3$ and $42_4$ belong is the correct group 43.

Subsequently, the processing proceeds to step S113, and the second processing executor 31 specifies erroneous recognition data on the basis of the result of the majority decision performed in step S112. For example, first, among all the extracted coordinate groups $33_k$, an extracted coordinate group $33_n$ ($n$=one or more of 1, 2, 3, and 4) that does not belong to the correct group 43 determined in step S112 is specified. Subsequently, a first depth image $32_n$ used for estimation of the specified extracted coordinate group $33_n$ is specified and set as the erroneous recognition data. The erroneous recognition data is a first depth image used for estimation of the extracted coordinate group $33_k$ that has a large difference from the shape of the actual hand 3 and is determined as erroneous recognition. In FIG. 9, since the extracted coordinate group $33_2$ does not belong to the correct group 43, the first depth image $32_2$ used to estimate the extracted coordinate group $33_2$ is specified.

Subsequently, the processing proceeds to step S114, after saving the erroneous recognition data specified in step S113, the second processing executor 31 ends the depth image collection processing. For example, the first depth image $32_n$ specified in step S113 is stored in the storage device 13. As a result, the input image (the first depth image $32_j$) can be automatically collected when the estimation results of the coordinates of the joint points $P_0$ to $P_{13}$ of the hand 3 are wrong due to the erroneous recognition caused by the input image. FIG. 9 exemplifies a case where the first depth image $32_2$ corresponding to the point $42_2$ that does not belong to the correct group 43 is stored.

In addition, as illustrated in FIG. 8, together with the first depth image $32_n$, the storage device 13 stores an inference result (image) $36_n$, an inference result (numerical value) $37_n$, a normalized inference result (numerical value) $38_n$, a determination result $39_n$, and an imaging condition $40_n$. As a result, in a case where the imaging condition can be changed when erroneous recognition caused by the input image occurs, by improving the imaging condition (for example, an installation position and an imaging mode) of the imaging unit $4_n$ with reference to the imaging condition $40_n$ stored in the storage device 13 in the past, a more appropriate first depth image $32_n$ (input image) can be captured. It is therefore possible to reduce erroneous recognition caused by a problem in the first depth image $32_n$, that is, erroneous recognition caused by the input image. On the other hand, in a case where it is difficult to change the imaging condition, the extracted coordinate group $33_n$ can be also appropriately estimated from the first depth image $32_n$ (input image) having a problem by causing the recognizer to relearn with the first depth image $32_n$ having the same imaging condition stored in the storage device 13 in the past.

In other words, it can be said that the processing according to a classification result from the classifier 29 is executed in steps S112, S113, and S114.

As described above, in the information processing apparatus 1 according to the present embodiment, the pose estimator 26 estimates the coordinates of the plurality of feature points (joint points $P_0$ to $P_{13}$) of the subject 3 (hand 3) on the basis of the first depth image $32_i$. Next, the rendering unit 27 generates a 3D CG model $34_i$ of the subject 3 (hand 3) on the basis of the coordinates of the estimated feature points (joint points $P_0$ to $P_{13}$), and renders a depth image (second depth image obtained by imaging the generated 3D CG model $34_i$ with the virtual camera. Subsequently, the similarity calculator 28 calculates the similarity between the first depth image $32_i$ and the second depth image $35_i$. Thereafter, the processing executor executes processing according to the calculated similarity.

Thus, for example, in a case where the estimation results of the coordinates of the feature points (joint points $P_0$ to $P_{13}$) are correct, the 3D CG model $34_i$ similar to the subject 3 (hand 3) is generated, the second depth image $35_i$ similar to the first depth image $32_i$ is generated, and the similarity between the first depth image $32_i$ and the second depth image $35_i$ increases. On the other hand, in a case where the estimation results of the coordinates of the feature points (joint points $P_0$ to $P_{13}$) are wrong, the 3D CG model $34_i$ different from the subject 3 (hand 3) is generated, the second depth image $35_i$ different from the first depth image $32_i$ is generated, and the similarity between the first depth image $32_i$ and the second depth image $35_i$ decreases. Therefore, by executing the processing according to the similarity, it is possible to provide the information processing apparatus 1 capable of automatically executing the processing according to an estimation result (recognition result) from a regression task, that is, estimation of the coordinates of the feature points (joint points $P_0$ to $P_{13}$) of the subject 3 (hand 3).

In addition, as the processing according to the similarity, upon determination that the similarity is less than the predetermined threshold value $T_H$, processing of storing the first depth image $32_i$ used for the determination in the storage device 13 is performed. Therefore, the recognition result at the time of operation can be automatically determined, erroneous recognition caused by the recognizer can be determined, and the input image (first depth image $32_i$) at the time of erroneous recognition can be automatically collected.

Furthermore, in the information processing apparatus 1 according to the present embodiment, the classifier 29 extracts, from the estimated coordinate groups $33_i$, a coordinate group $33_i$ estimated on the basis of the first depth image $32_i$ having a similarity greater than or equal to the predetermined threshold value $T_H$, and classifies the extracted coordinate group $33_k$ (extracted coordinate group $33_k$) into a group $41_m$ for each similar coordinate group. Subsequently, the second processing executor 31 executes processing according to the classification result from the classifier 29. Thus, for example, the extracted coordinate group $33_k$ in which erroneous recognition caused by the input image has not occurred is classified into the same group $41_m$ (correct group 43). On the other hand, for example, the extracted coordinate group $33_k$ in which erroneous recognition caused by the input image has occurred is not classified into the correct group 43. Therefore, by executing the processing according to the classification result from the classifier 29, it is possible to provide the information processing apparatus 1 capable of automatically executing the processing according to an estimation result (recognition result) from a regression task, that is, estimation of the coordinates of the feature points (joint points $P_0$ to $P_{13}$) of the subject 3 (hand 3).

Furthermore, as processing according to the classification result, processing of storing, in the storage device 13, the first depth image $32_k$ and the imaging condition $40_k$ used for estimation of the extracted coordinate group $33_k$ that does not belong to the group having the largest number of elements among all the extracted coordinate groups $33_k$ is performed. Therefore, the recognition result at the time of operation can be automatically determined, erroneous recognition caused by the input image can be determined, and the input image (first depth image $32_i$) and the imaging condition $40_k$ at the time of erroneous recognition can be automatically collected.

3. Modifications (1) In the present embodiment, as illustrated in FIG. 8, a case has been illustrated where the storage device 13 in the information processing apparatus 1 stores data such as the first depth image $32_j$, the inference result (image) $36_j$, the inference result (numerical value) $37_j$, the normalized inference result (numerical value) $38_j$, the determination result $39_j$, and the imaging condition $40_j$. Alternatively, other configurations can be adopted. For example, the above data may be stored in a storage device of a server disposed on a network via the communication unit 14.

(2) Furthermore, in the present embodiment, as illustrated in steps S109 and S114 of FIG. 4, a case has been illustrated where only the first depth image $32_i$ that has been erroneously recognized among the first depth images $32_i$ acquired in step S101 is stored in the storage device 13. Alternatively, other configurations may be adopted. For example, all the first depth images $32_i$ acquired in step S101 may be stored in the storage device 13, and a flag indicating erroneous recognition may be set in the erroneously recognized first depth image $32_i$. Alternatively, for example, the first depth image $32_i$ is not required to be stored, and the recognition result (coordinate group $33_i$) obtained from the erroneously recognized first depth image $32_i$ is not required to be used for other processing and control.

Furthermore, the present technology may include the following technical matters.

(1)

An information processing apparatus includes an acquirer that acquires a first depth image that is a depth image of an area including a subject, a pose estimator that estimates coordinates of a plurality of feature points of the subject on the basis of the first depth image acquired by the acquirer, a rendering unit that generates a three dimensional computer graphics (3D CG) model of the subject on the basis of the coordinates of the feature points estimated by the pose estimator, and renders a second depth image that is a depth image obtained by imaging the 3D CG model having been generated with a virtual camera, a similarity calculator that calculates similarity between the first depth image acquired by the acquirer and the second depth image rendered by the rendering unit, and a processing executor that executes processing according to the similarity calculated by the similarity calculator.

(2)

In the information processing apparatus according to (1), upon determination that the similarity calculated by the similarity calculator is less than a predetermined threshold value, the processing executor stores the first depth image used for the determination in a storage device.

(3)

In the information processing apparatus according to (1) or (2), the pose estimator estimates the coordinates of the feature points on the basis of a depth image acquired by the acquirer by using a recognizer learned by teacher data including a depth image of a hand and the coordinates of the feature points in the depth image.

(4)

In the information processing apparatus according to any of (1) to (3), the rendering unit generates the 3D CG model of the subject by deforming a 3D CG model prepared in advance such that coordinates of feature points of the 3D CG model prepared in advance coincide with the coordinates of the feature points estimated by the pose estimator.

(5)

In the information processing apparatus according to any of (1) to (4), the acquirer acquires each of the first depth images captured from a plurality of predetermined positions, the pose estimator estimates coordinate groups that are sets of the coordinates of the feature points, on the basis of each of the first depth images for each of the first depth images acquired by the acquirer, and the information processing apparatus includes a classifier that extracts, from the coordinate groups estimated by the pose estimator, the coordinate groups estimated on the basis of the first depth image whose similarity calculated by the similarity calculator is greater than or equal to a predetermined threshold value, and classifies extracted coordinate groups that are the coordinate groups having been extracted into groups for each similar coordinate group, and a second processing executor that executes processing according to a classification result from the classifier.

(6)

In the information processing apparatus according to (5), the classifier classifies the extracted coordinate groups into groups by clustering the extracted coordinate groups by using the coordinates of the feature points included in the extracted coordinate groups.

(7)

In the information processing apparatus according to (6), the classifier uses hierarchical clustering as a method of the clustering.

(8)

In the information processing apparatus according to (5), the second processing executor stores, in a storage device, the first depth image used for estimation of the extracted coordinate group that does not belong to a group having a largest number of elements among all the extracted coordinate groups.

(9)

In the information processing apparatus according to (8), the subject includes a hand.

(10)

In the information processing apparatus according to (9), the classifier performs, for each of the extracted coordinate groups, normalization processing of translating positions of the feature points with respect to the coordinates of the feature points included in the extracted coordinate groups such that a predetermined position specified by the coordinates coincides with an origin of a local coordinate system indicating the extracted coordinate groups, and rotating the positions of the feature points about the origin such that the hand indicated by the extracted coordinate groups faces a predetermined direction in the local coordinate system, and classifies the extracted coordinate groups into groups by clustering the extracted coordinate groups by using the coordinates having been subjected to the normalization processing.

(11)

In the information processing apparatus according to (10), in the normalization processing, the positions of the feature points are rotated on the basis of the coordinates of the feature points such that a vector extending from a wrist toward a fingertip of the hand indicated by the coordinate groups is directed in a first direction in the local coordinate system, and a normal vector of a back of the hand is along a second direction forming 90 degrees with the first direction in the local coordinate system.

(12)

In the information processing apparatus according to (10), in the normalization processing, the positions of the feature points are rotated on the basis of the coordinates of the feature points such that a vector extending from a wrist toward a fingertip of the hand indicated by the coordinate groups is directed in a first direction in the local coordinate system, and a normal vector extending from a thumb toward a little finger is along a second direction forming 90 degrees with the first direction in the local coordinate system.

(13)

In the information processing apparatus according to (10), in the normalization processing, the positions of the feature points are rotated on the basis of the coordinates of the feature points such that a vector extending from a thumb toward a little finger of the hand indicated by the coordinate groups is directed in a first direction in the local coordinate system, and a normal vector of a back of the hand is along a second direction forming 90 degrees with the first direction in the local coordinate system.

(14)

In the information processing apparatus according to (8), the classifier performs, for each of the extracted coordinate groups, normalization processing of converting the coordinates of the feature points included in the extracted coordinate groups expressed in a local coordinate system indicating the extracted coordinate groups into a global coordinate system, and classifies the extracted coordinate groups into groups by performing clustering by using the coordinates having been subjected to the normalization processing.

(15)

An information processing apparatus includes an acquirer that acquires each of first depth images that are depth images of an area including a subject, the first depth images being captured from a plurality of predetermined positions, a pose estimator that estimates coordinate groups that are sets of coordinates of feature points by using a learned recognizer for each of the first depth images acquired by the acquirer on the basis of the first depth images, a classifier that extracts, from the coordinate groups estimated by the pose estimator, the coordinate groups in which erroneous recognition caused by the recognizer is determined not to have occurred, and classifies extracted coordinate groups that are the coordinate groups having been extracted into groups for each similar coordinate group, and a second processing executor that executes processing according to a classification result from the classifier.

(16)

An information processing method includes acquiring a first depth image that is a depth image of an area including a subject, estimating coordinates of a plurality of feature points of the subject on the basis of the first depth image having been acquired, generating a three dimensional computer graphics (3D CG) model of the subject on the basis of the coordinates of the feature points having been estimated, rendering a second depth image that is a depth image obtained by imaging the 3D CG model having been generated with a virtual camera, calculating similarity between the first depth image having been acquired and the second depth image having been rendered, and executing processing according to the similarity having been calculated.

REFERENCE SIGNS LIST

1 Information processing apparatus
2 Detection space
3 Subject (hand)
4ᵢ Imaging unit
5 Device body
6 Processor

7 ROM

8 RAM

9 Bus

10 Input-output interface

11 Input unit

12 Output unit

13 Storage device

14 Communication unit

15 Drive

17 Removable medium

17 Inference processing unit

18 Inference result determiner

19 Image generator

20 Similarity determiner

21 Input image determiner

22 Similarity determiner

23 Inference result determiner

24 Image storage

25 Acquirer

26 Pose estimator

27 Rendering unit

28 Similarity calculator

29 Classifier

30 Processing executor

31 Second processing executor $32_i$ First depth image $33_i$ Coordinate group (extracted coordinate group)

$34_i$ 3D CG model $35_i$ Second depth image $36_i$ Inference result (image)

$37_i$ Inference result (numerical value)

$38_j$ Normalized inference result (numerical value)

$39_i$ Determination result $40_1$ Imaging condition $41_1$ Group $42_1$ Point

43 Correct group

The invention claimed is:

1. An information processing apparatus, comprising:

a memory; and a central processing unit (CPU) configured to:

acquire a first depth image of a plurality of first depth images, wherein the first depth image is of an area that includes a subject;

determine, based on the first depth image, a first plurality of coordinates of a plurality of feature points of the subject;

generate, based on the first plurality of coordinates of the plurality of feature points, a first three dimensional computer graphics (3D CG) model of the subject;

perform an imaging process on the first 3D CG model;

render a second depth image based on the imaging process, wherein a virtual camera generates the second depth image;

determine a similarity between the first depth image and the second depth image; and execute a first process based on the determined similarity.

2. The information processing apparatus according to claim 1, wherein memory is configured to store the first depth image based on the determined similarity that is less than a threshold value.

3. The information processing apparatus according to claim 1, wherein the CPU is further configured to determine the first plurality of coordinates of the plurality of feature points based on the first depth image, and a recognizer learned based on teacher data including each of a third depth image of a hand and a second plurality of coordinates of the plurality of feature points of the subject in the third depth image.

4. The information processing apparatus according to claim 1, wherein the CPU is further configured to:

deform a second 3D CG model, wherein a second plurality of coordinates of the plurality of feature points coincide with the first plurality of coordinates of the plurality of feature points, and the second plurality of coordinates is associated with the second 3D CG model; and generate the first 3D CG model of the subject based on the deformed second 3D CG model.

5. The information processing apparatus according to claim 1, wherein the CPU is further configured to:

acquire each of the plurality of first depth images captured from a plurality of positions;

determine a plurality of coordinate groups based on the each of the plurality of first depth images, wherein the plurality of coordinate groups corresponds to a plurality of sets of the first plurality of coordinates of the plurality of feature points;

extract, based on the determined similarity that is greater than or equal to a threshold value, a set of coordinate groups of the plurality of coordinate groups; and classify the extracted set of coordinate groups into a plurality of subsets of coordinate groups, wherein the extracted set of coordinate groups includes a second plurality of coordinates of the plurality of feature points; and a execute a second process based on the classification.

6. The information processing apparatus according to claim 5, wherein the CPU is further configured to perform, based on the second plurality of coordinates of the plurality of feature points, a clustering process on the extracted set of coordinate groups; and classify, based on the clustering process, the extracted set of coordinate groups into the plurality of subsets of coordinate groups.

7. The information processing apparatus according to claim 6, wherein the clustering process corresponds to a hierarchical clustering process.

8. The information processing apparatus according to claim 5, wherein the memory is configured to store, each of the first depth image and an imaging condition, the imaging condition is associated with a specific coordinate group of the extracted set of coordinate groups, the specific coordinate group is not included in a specific subset of the plurality of subsets of coordinate groups, the specific subset includes a plurality of elements, and a number of the plurality of elements of the specific subset is higher than a number of a plurality of elements of each of all the extracted set of coordinate groups.

9. The information processing apparatus according to claim 8, wherein the subject includes a hand.

10. The information processing apparatus according to claim 9, wherein the CPU is further configured to:

perform a normalization process for each of the extracted set of coordinate groups, wherein the normalization process includes:

translation of a plurality of positions of the plurality of feature points with respect to the second plurality of coordinates of the plurality of feature points, wherein a specific position of the plurality of positions coincides with an origin of a local coordinate system, and the local coordinate system indicates the extracted set of coordinate groups, and rotation of the plurality of positions of the plurality of feature points about the origin such that the hand faces a specific direction in the local coordinate system, wherein the extracted set of coordinate groups indicates the hand;

perform a clustering process on the extracted set of coordinate groups; and classify, based on the clustering process, the extracted set of coordinate groups into the plurality of subsets of coordinate groups.

11. The information processing apparatus according to claim 10, wherein the CPU is further configured to rotate, based on the second plurality of coordinates of the plurality of feature points, the plurality of positions of the plurality of feature points such that a specific vector is in a first direction in the local coordinate system, a normal vector is in a second direction, and the normal vector is at 90 degrees with the first direction in the local coordinate system, the specific vector extends from a wrist of the hand to a fingertip of the hand, and the normal vector is of a back of the hand.

12. The information processing apparatus according to claim 10, wherein the CPU is further configured to rotate, based on the second plurality of coordinates of the plurality of feature points, the plurality of positions of the plurality of feature points such that a specific vector is in a first direction in the local coordinate system, a normal vector is in second direction, and the normal vector is at 90 degrees with the first direction in the local coordinate system, the specific vector extends from a wrist of the hand to a fingertip of the hand, and the normal vector extends from a thumb of the hand to a little finger of the hand.

13. The information processing apparatus according to claim 10, wherein the CPU is further configured to rotate, based on the second plurality of coordinates of the feature points, the plurality of positions of the plurality of feature points such that a specific vector is in a first direction in the local coordinate system, a normal vector is in a second direction, and the normal vector is at 90 degrees with the first direction in the local coordinate system, the specific vector extends form a thumb of the hand to a little finger of the hand, and the normal vector is of a back of the hand.

14. The information processing apparatus according to claim 8, wherein the CPU is further configured to:

perform, a normalization process, for each of the extracted set of coordinate groups, to convert the second plurality of coordinates of the feature points expressed in a local coordinate system into a global coordinate system;

perform a clustering process on the extracted set of coordinate groups; and classify, based on the clustering process, the extracted set of coordinate groups into the plurality of subsets of coordinate groups.

15. An information processing apparatus, comprising:

a central processing unit (CPU) configured to:

acquire each of a plurality of first depth images of an area that includes a subject, wherein the plurality of first depth images is captured from a plurality of positions;

determine, based on a learned recognizer for the each of the plurality of first depth images, a plurality of coordinate groups, wherein the plurality of coordinate groups corresponds to a plurality of sets of coordinates of feature points of the subject;

generate, based on the plurality of coordinate groups, a plurality of three dimensional computer graphics (3D CG) models of the subject:

perform an imaging process on each of the plurality of 3D CG models;

render a plurality of second depth images for the each of the plurality of first depth images based on the imaging process, wherein a virtual camera generates the plurality of second depth images;

determine a similarity between the each of the plurality of first depth images and a respective second depth image of the plurality of second depth images;

determine an absence of erroneous recognition in a set of coordinate groups of the plurality of coordinate groups;

extract the set of coordinate groups of the plurality of coordinate groups, based on the determined similarity that is greater than or equal to a threshold value and the determination of the absence of the erroneous recognition;

classify the extracted set of coordinate groups into a plurality of subsets of coordinate groups; and execute a specific process based on the classification.

16. An information processing method, comprising:

in an information processing apparatus:

acquiring a first depth image of an area that includes a subject;

determining, based on the first depth image, a first plurality of coordinates of a plurality of feature points of the subject;

generating, based on the first plurality of coordinates of the plurality of feature points, a three dimensional computer graphics (3D CG) model of the subject;

performing an imaging process on the 3D CG model;

rendering a second depth image based on the imaging process, wherein a virtual camera generates the second depth image;

determining a similarity between the first depth image and the second depth image; and executing a specific process based on the determined similarity.

* * * * *